(12) United States Patent
Berry et al.

(10) Patent No.: US 9,723,790 B2
(45) Date of Patent: Aug. 8, 2017

(54) WEED SEED DEVITALIZATION ARRANGEMENT

(71) Applicants: GRAINS RESEARCH & DEVELOPMENT CORPORATION, Barton, Australian Capital Territory (AU); UNIVERSITY OF SOUTH AUSTRALIA, Adelaide, South Australia (AU)

(72) Inventors: Nicholas Kane Berry, North Adelaide (AU); Chris Saunders, Prospect (AU)

(73) Assignees: GRAINS RESEARCH & DEVELOPMENT CORPORATION, Barton (AU); UNIVERSITY OF SOUTH AUSTRALIA, Adelaide (AU)

( * ) Notice: Subject to any disclaimer, the term of this patent is extended or adjusted under 35 U.S.C. 154(b) by 26 days.

(21) Appl. No.: 14/768,159

(22) PCT Filed: Feb. 19, 2014

(86) PCT No.: PCT/AU2014/000140
§ 371 (c)(1),
(2) Date: Aug. 14, 2015

(87) PCT Pub. No.: WO2014/127408
PCT Pub. Date: Aug. 28, 2014

(65) Prior Publication Data
US 2015/0373913 A1    Dec. 31, 2015

(30) Foreign Application Priority Data

Feb. 19, 2013   (AU) ................................ 2013900553

(51) Int. Cl.
| | | |
|---|---|---|
| *A01F 12/40* | (2006.01) | |
| *A01D 41/12* | (2006.01) | |
| *A01F 12/00* | (2006.01) | |

(52) U.S. Cl.
CPC .............. *A01F 12/00* (2013.01); *A01D 41/12* (2013.01); *A01D 41/1243* (2013.01); *A01F 12/40* (2013.01)

(58) Field of Classification Search
CPC ..... A01F 12/00; A01F 12/40; A01D 41/1243; B02C 13/09
(Continued)

(56) References Cited

U.S. PATENT DOCUMENTS 3,411,724 A    11/1968  Noe
3,894,695 A *   7/1975  Benedikter ........... B02C 13/288
                                                  241/188.1
(Continued)

FOREIGN PATENT DOCUMENTS

AU    771302 B2    3/2004
DE   3540493 C1    4/1987
(Continued)

OTHER PUBLICATIONS

International Search Report, issued in PCT/AU2014/000140, dated Mar. 25, 2014.
(Continued)

*Primary Examiner* — John G Weiss
(74) *Attorney, Agent, or Firm* — Birch, Stewart, Kolasch & Birch, LLP

(57) ABSTRACT

A weed seed devitalization arrangement for use with a. combine harvester, attached to the combine harvester, towed behind, or standalone. The weed seed devitalization arrangement receives weed seeds entrained in a. portion of the air and material previously discharged from a combine harvester or other crop/lawn cutung apparatus. The weed seed devitalization arrangement includes a roton'stator arrangement including but not necessarily excluding other elements, one or more stationary substantially circular array of weed seed impact members, the members being arranged so as to impact weed seeds being provided into the substantially circular array; and one or more rotatable substantially circular array of weed seed impact members, the rotatable array movable with respect to a stationary substantially circular array of weed seed impact members, the impact members of (Continued)

the rotatable substantially circular array arranged to impact weed seeds being directed through the rotatable substantially circular array. Another element may be a driven rotating clement at or near the central portion of the rotor/stator arrangement for receiving the portion of air and material discharged from the combine harvester entrained with weed seeds and for providing a flow of air and entrained material including weed seed into the arrays of the arrangement.

17 Claims, 14 Drawing Sheets

(58) Field of Classification Search
USPC .................. 460/111, 112; 241/188.1–188.2, 241/189.1–189.2, 190, 191
See application file for complete search history.

(56) References Cited

U.S. PATENT DOCUMENTS

| | | | | |
|---|---|---|---|---|
| 5,556,042 A | * | 9/1996 | Roberg | A01F 12/40 241/101.76 |
| 5,597,127 A | * | 1/1997 | Brown | B02C 13/205 241/188.2 |
| 5,928,080 A | * | 7/1999 | Jakobi | A01F 12/40 460/112 |
| 6,070,816 A | * | 6/2000 | Hirsch | A01F 12/40 241/101.742 |
| 6,435,433 B1 | * | 8/2002 | Hesch | B02C 13/205 241/186.35 |
| 8,105,140 B2 | * | 1/2012 | Teroerde | A01D 41/1243 460/112 |
| 8,152,610 B2 | | 4/2012 | Harrington | |
| 8,789,785 B2 | * | 7/2014 | Lelas | B02C 13/20 241/188.1 |
| 8,864,561 B2 | * | 10/2014 | Weichholdt | A01D 41/1243 460/112 |

FOREIGN PATENT DOCUMENTS

| | | |
|---|---|---|
| DE | 102 03 502 A1 | 10/2003 |
| EP | 0764470 B1 | 7/2000 |

OTHER PUBLICATIONS

International Preliminary Report on Patentability, issued in PCT/AU2014/000140, dated Mar. 3, 2015.
Written Opinion of the International Searching Authority, issued in PCT/AU2014/000140, dated Mar. 25, 2014.

* cited by examiner

WEED SEED DEVITALIZATION ARRANGEMENT

TECHNICAL FIELD

The present invention relates to combine harvesters and, in particular, to the use of arrangements to devitalize weed seed entrained in a portion of the air and material discharged from a combine harvester.

BACKGROUND

Weeds are a continual threat to the yield of grain crops throughout the world because they compete with the stop for water, sunlight and nutrients. In many parts of the world, herbicides are heavily relied upon to control weeds. Herbicides have facilitated agricultural systems based on minimum tillage (soil disturbance) resulting in reduced soil erosion, evaporation and improved crop yields. However, the heavy reliance on herbicides has led to the evolution of herbicide resistant weeds, which now threaten global food production.

Researchers have found that one way to gain control of herbicide resistant weeds is to remove the weed's seeds from the field before the seeds shed and land on the soil. Removing the weed's seeds, interrupts the reproduction of plants, resistant or not resistant, and thus controls the evolution of herbicide resistant weeds. During grain harvest there is an opportunity to collect weed seeds using a combine harvester and thus control herbicide resistant weeds. Weed seeds above the cut height of the combine harvester enter the harvester and are processed. The weed seeds are removed from the plant stem in the combine harvester's thresher and fall onto the combine harvester's cleaning sieve. The size and aerodynamic properties of a weed seed determines its fate in the harvester. Seeds small enough to fit through the harvester sieve that have a terminal velocity similar or higher than the gain fall through the harvester sieve and end up in the grain tank. Seeds that are too large to fall through the sieve or have a terminal velocity lower than the grain are likely to exit the rear of the combine harvester with the residue material (mostly chaff residue material). Commonly, this residue material is collected to remove weed seeds from the field by using a chaff residue material cart, or baler, or simply placing the residue material in a row to be burnt. However, all of these methods remove nutrient rich residues from the field which goes against the principle of retaining maximum possible residue cover for conservation agriculture methods. Furthermore, all of these methods require post-harvest operations, and those are an added cost and time commitment to the farmer.

An attractive alternative to removing or burning residue material to control weed seeds is to devitalize the weed seeds in the field and retain all the residues and hence nutrients in the field. Physically damaging seeds by milling has long been known to devitalize seeds. Technology to process weed seeds with a mill concurrently with grain harvest has long been sought which has resulted in some prior art arrangements.

U.S. Pat. No. 3,448,933 (Roy and Bailey 1969) described a roller shear mill to process weed seeds in the clean grain screenings. However, this approach still allows weed seeds with low terminal velocity to exit with the residue material and be spread by the harvester. Furthermore, newer combine harvesters do not screen the clean grain and so this invention is not applicable for modern combine harvesters. U.S. Pat. No. 5,059,154 (Reyenga 1991) describes using of a pair of rollers to mill chaff residue material at the exit of the harvester sieve. Using a crushing action to damage seeds in a large stream of chaff residue material is problematic as surrounding material can cushion seeds. Another mill was developed to be more effective than roller milling as described in another patent AU 2001038781 (Zani 2001). The mill disclosed in that patent only had the capacity to process a small proportion of the total chaff residue material exiting the harvester sieve. Thus, this invention relied on removing the majority of the chaff residue material with a sieve prior to being processed. The sieve used to separate weed seeds from chaff residue material was not able to handle the increased chaff material residue loads when modern combine harvesters increased in capacity and thus development has not continued.

An alternative approach was adopted for the Harrington Seed Destructor (HSD) U.S. Pat. No. 8,152,610 (Harrington 2012) by processing the entire chaff residue material stream. The HSD uses a cage mill modified from the mining industry to pulverize the chaff residue material and any weed seeds contained within as they are discharged from the combine harvester. Due to the size, weight and power requirement of the cage mill, the HSD is trailer mounted with its own engine towed behind the combine harvester. The chaff residue material and straw is transferred from the combine harvester to the HSD through flexible connections.

The cost and complexity of the HSD is likely to limit its commercial viability. To reduce the cost and complexity of harvest time weed control, it is desirable to have a weed seed devitalization device integrated into a combine harvester capable of dealing with the large volume and rate of discharge of air and chaff residue material entrained with weed seeds exiting the harvester sieve.

The HSD cage mill is not suitable for integration into a combine harvester because:
1) power consumption of the cage mill is such that it requires a separate power source;
2) the large size of the mill is not readily integrated into the already large combine harvester;
3) the complication of a counter rotating cage drive system adds size, weight and complex drive mechanisms;
4) the heavy weight of the cage mill, frame work and drive system would add to the already sizable weight of a combine harvester;
5) the conversion of a wide rectangular feed from the harvester sieve to the small circular feed of the cage mill with the drive shaft going through the inlet, introduces considerable spacing issues if it is to be integrated into a combine harvester.

BRIEF DESCRIPTION OF THE INVENTION

In an aspect of the invention, a weed seed devitalization arrangement for receiving weed seeds entrained in a portion of the air and material discharged from a combine harvester, the arrangement includes a rotor/stator arrangement including: one or more stationary substantially circular array of weed seed impact members, the members being arranged so as to impact weed seeds being directed outward from the driven rotating element; and one or more rotatable substantially circular array of weed seed impact members, the rotatable array movable with respect to a stationary substantially circular array of weed seed impact members, the impact members of the rotatable substantially circular array arranged to impact weed seed being directed outward.

In a further aspect of the invention there is a further element being a driven rotating element at or near the central portion of the rotor/stator arrangement for receiving the portion of air and material discharged from the combine harvester entrained with weed seeds and for creating a flow of air and entrained material including weed seeds, the flow being outwards from the rotational axis of the driven rotating element.

In a further aspect of the invention there are at least two stationary substantially circular arrays of weed seed impact members; or at least two rotatable substantially circular arrays of weed seed impact members.

In yet a further aspect of the invention there is a combine harvester including a weed seed devitalization arrangement located on the combine harvester so as to receive a portion of the air and material discharged from the harvester.

In another aspect of the invention there is a weed seed devitalization arrangement for processing weed seeds entrained in a portion of the air and material discharged, including a collection and delivery mechanism for receiving material including weed seeds and entraining the material and weed seed in an air flow, a rotor/state arrangement including; a driven rotating element at or near the central portion of the rotor/stator arrangement for receiving the flow of air and material entrained with weed seeds and for creating a flow of air and entrained material including weed seeds, the flow being outwards from the rotational axis of the driven rotating element; one or more stationary substantially circular array of weed seed impact members, the members being arranged so as to impact weed seeds being directed outward from the driven rotating element; and one or more rotatable substantially circular array of weed seed impact members, the rotatable array movable with respect to a stationary substantially circular array of weed seed impact members, the impact members of the rotatable substantially circular array arranged to impact weed seeds being directed outward.

Throughout this specification weed seeds are referred to as including both seeds from plants foreign to the crop being harvested and the seeds exiting the harvester (grain loss) from the crop being harvested. The seeds exiting the harvester from the crop being harvested become volunteer crop weeds in the following season; hence the term weed seeds is used for both.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgment or any form of suggestion that such background of prior art forms part of the common general knowledge.

Specific embodiments of the invention will now be described in some further detail with reference to and as illustrated in the accompanying figures. These embodiments are illustrative, and not meant to be restrictive of the scope of the invention. Suggestions and descriptions of other embodiments may be included within the scope of the invention but they may not be illustrated in the accompanying figures or alternatively features of the invention may be shown in the figures but not described in the specification.

BRIEF DESCRIPTION OF FIGURES

FIG. 8AA depicts a magnified view of a portion of FIG. 8A depicting the state and rotor;

DETAILED DESCRIPTION OF EMBODIMENTS OF THE INVENTION

This specification refers to a weed seed devitalization arrangement capable of attaching to, being driven by and handling the material flow of the large modem combine harvesters (e.g. class 8 and 9) for harvesting grain crops, the harvester weighing in the order of 16 tonnes, with engine power in the order of 350 kilowatts, with width of grain reaper of 12 meters. The combine harvester is capable of harvesting a wide range of grain crops at high throughputs. For example a modern combine harvester cast harvest over 40 tonnes per hour of wheat, expelling 12 tonnes per hour of chaff residue material laden in art air stream of 5-7 cubic meters per second, and expelling 20 tonnes per hour of straw. The combine harvester is used for example purposes only to illustrate the characteristics of at least one combine harvester.

It is also possible for the weed seed devitalization arrangement to be used to process material containing weed seed that has been stored and that is introduced into the arrangement within a flow of air.

Weed seed devitalization is defined as the reduction in germination of processed seeds compared to the unprocessed seeds. It is a measure of the efficacy of a weed control method applied to weed seeds. A set number of seeds from a batch of seeds are processed and then planted. The same number of unprocessed seeds from the same batch of seeds is planted. The emergence of the seedlings of both processed and unprocessed are counted. The weed seed devitalization is calculated as a percentage as shown in Equation 1 provided below. If zero processed seeds germinate then the weed seed devitalization is 100%, or if she same number of processed seeds emerge as unprocessed seeds emerge, then the weed seed devitalization is 0%.

Weed seed devitalization (%)=100−(number of processed seeds emerged/number of unprocessed seeds emerged)×100   Equation (1)

Figure 1:
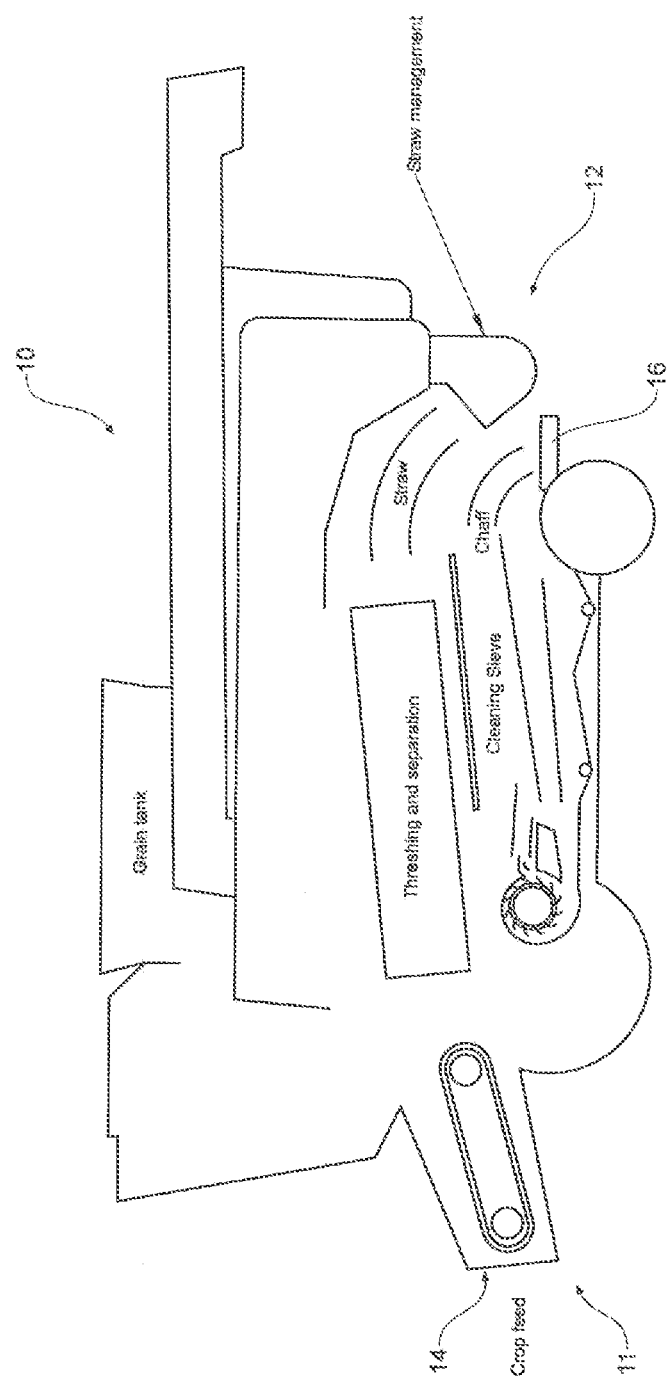
FIG. 1 depicts a cut-away view of a combine harvester.

FIG. 1 depicts a cut-away view an idealized view of a combine harvester machine 10. The front end of the machine 11 and the rear end of the harvester 12 are shown, with the grain and straw input 14 at the front adapted to harvest she grain at an appropriate rate. The internal arrangement within the harvester separates the grain, straw and other material. The straw is transported and discharged from the rear of the harvester either spread evenly over the width cut by the front, or its a narrow row so that it can be handled and used at a future time. The other material has multiple components, namely, chaff residue material with pieces of broken straw of various sizes, weed seeds, interior and exterior wheat cap (very light and soft), and dust. All of these components have different sizes, weights, and when airborne, different terminal velocities.

Figure 2:
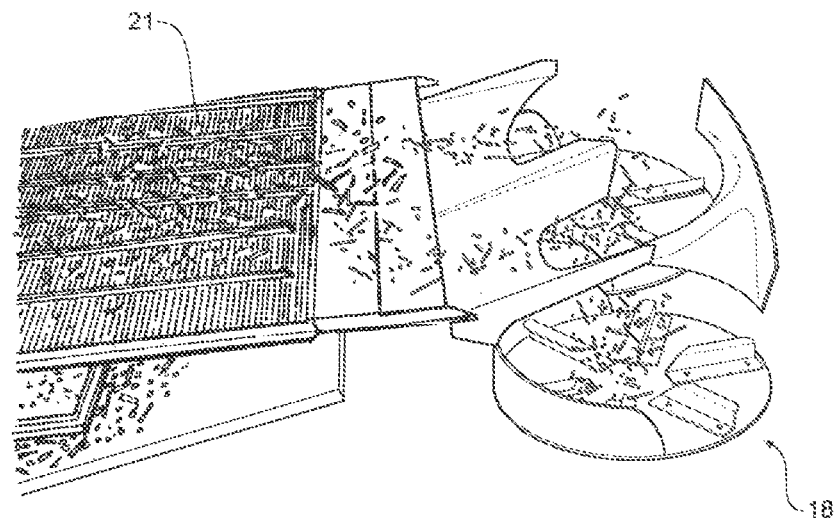
FIG. 2 depicts prior art chaff residue material spreaders located at one of the outlets of the discharge of air and material from a combine harvester.

In an embodiment a weed seed devitalization arrangement 16 is located at the rear of the machine 12 as a replacement for the chaff residue material spreader 18 that is depicted it FIG. 2 (Prior Art). Chaff spreaders are not used on all combine harvesters but the location shown is suitable for a weed seed devitalization arrangement.

Figure 3:
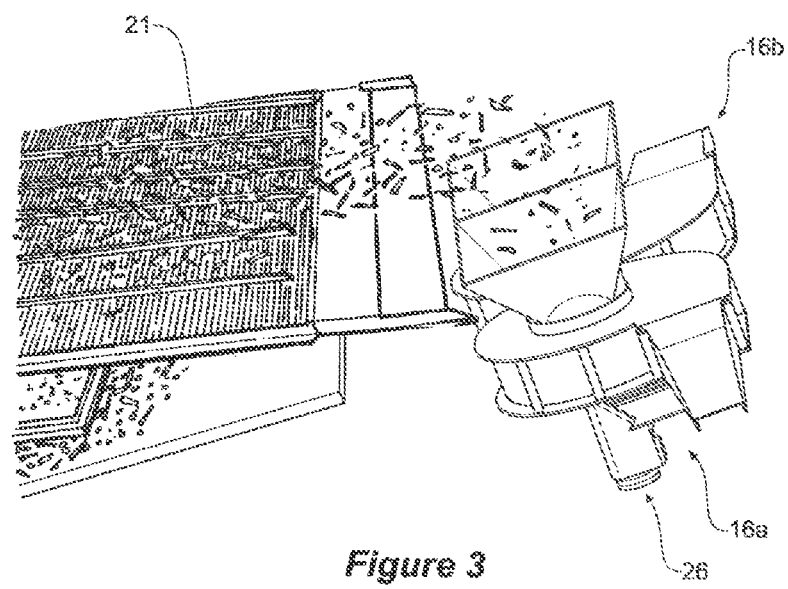
FIG. 3 depicts an embodiment of the invention in a similar position as one of the chaff residue material spreaders depicted at FIG. 2.

FIG. 3 depicts two weed seed devitalization arrangements 16a and 16b that work to receive weed seeds entrained in a portion of the air and material discharged from the combine harvester machine 10 and illustrate that the prior art arrangement can be readily replaced.

Figure 4:
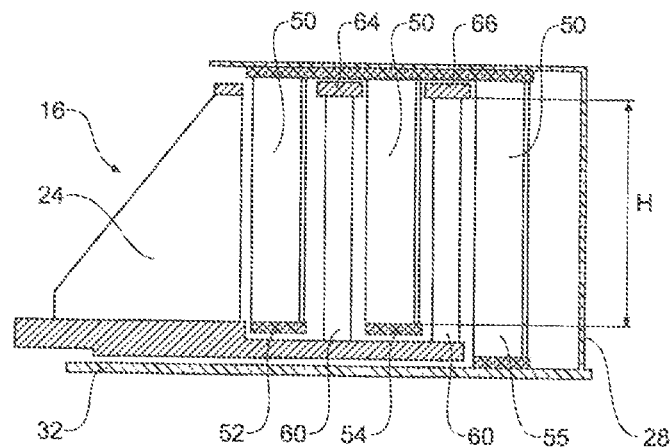
FIG. 4 depicts a side view of an impact member in a configuration that illustrates the factors of which contribute to their effective height.
Figure 5:
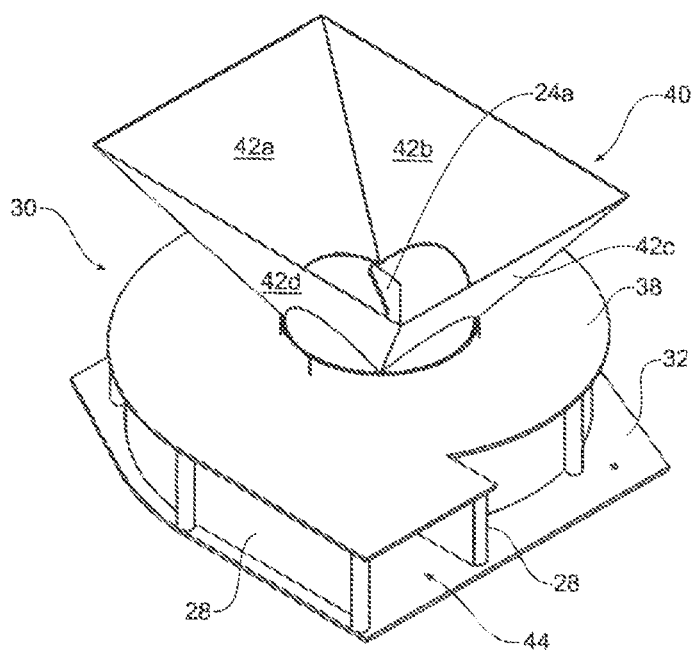
FIG. 5 depicts an external perspective view of an embodiment of a weed seed devitalization arrangement.

FIGS. 4 and 5 are described later in the specification.

In this specification the term rotor is sometimes used to identify a substantially circular array of impact members which rotate or are rotatable, while the term stator is sometimes used to identify a substantially circular array of impact members which are stationary with respect to the rotor/s.

In FIGS. 6 to 9, three different embodiments of a weed seed devitalization arrangement 16 are depicted as A, B and C respectively. The details of the three embodiments of the weed seed devitalization arrangement 16 are best illustrated in FIGS. 6A, 6B and 6C and 7A, 7B and 7C. One half of an embodiment of the weed seed devitalization arrangement 16 is shown in FIGS. 6A, 6B and 6C, which depicts the rotors (rotatable arrays) 20, and 22 each having an array multiple impact members 60, and a centrally located rotating dement 24. Not shown in detail, is that in an embodiment each of the rotors 20, and 22 and a centrally located rotating element 24 are connected to a single plate 62 which is rotationally driven by the rotational motion driver 26 as is depicted in FIG. 5. An embodiment of the rotational driver is a driven motor. Details of the rotors 20 and 22 will be described in greater detail later in this specification. In one embodiment the driver is hydraulically driven.

Figure 6A:
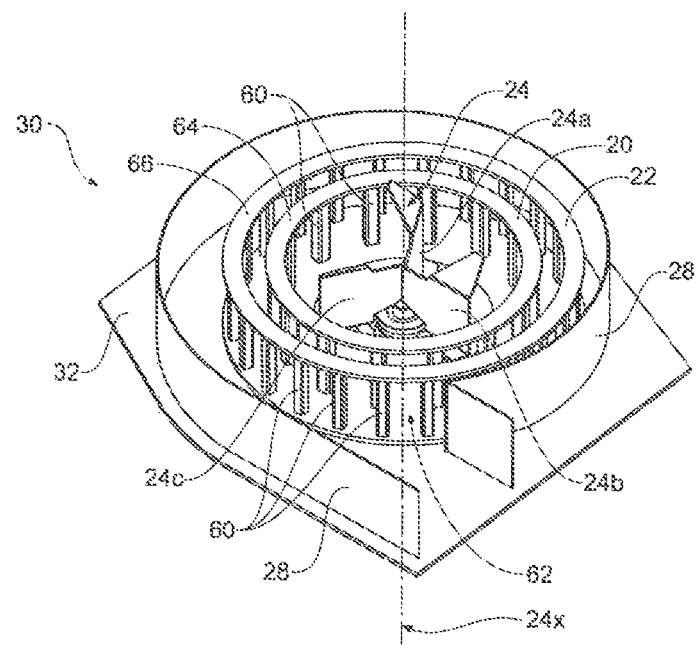
FIG. 6A depicts an exploded perspective view of the rotor of embodiment A of a weed seed devitalization arrangement.
Figure 6B:
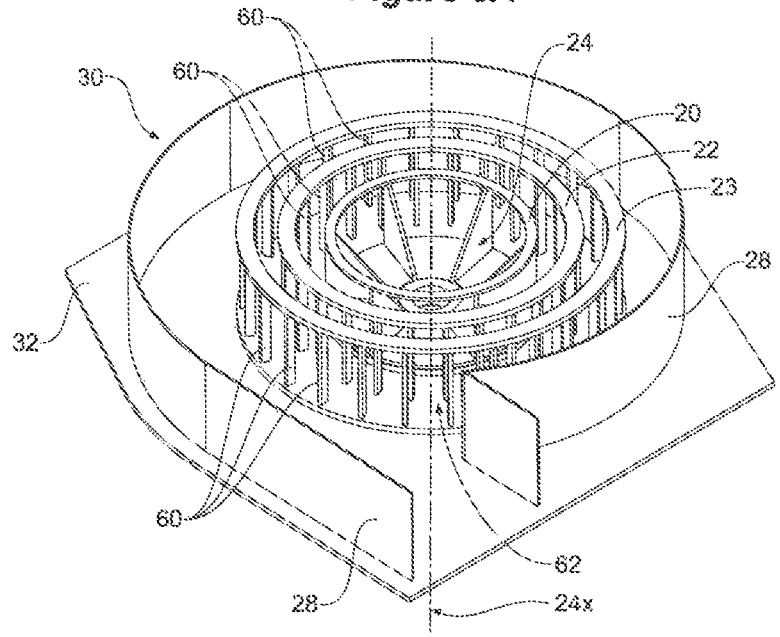
FIG. 6B depicts an exploded perspective view of the rotor of another embodiment B of a weed seed devitalization arrangement.

Also depicted in FIGS. 6A and 6B are outer walls of a housing 30. The housing in this embodiment includes: a wall 28 connected to a plate 32, which in this embodiment is a plate located below the rotors 20, and 22, the centrally located rotating element 24 and single plate 62; which forms the lower wall of the weed seed devitalization arrangement 16.

In a further embodiment not shown, each of the rotatable impact members and the centrally located rotating element 24 are independently rotatable.

Figure 6C:
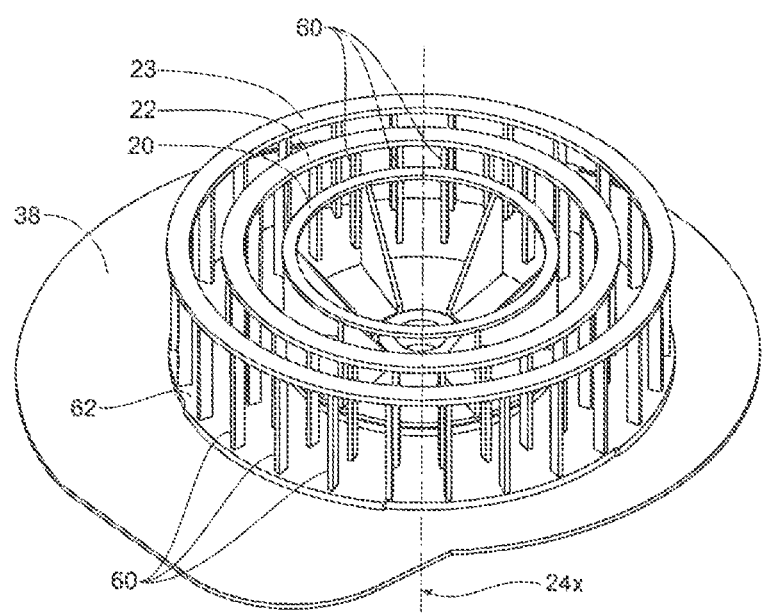
FIG. 6C depicts an exploded perspective view of the rotor of another embodiment C of a weed seed devitalization arrangement.
Figure 7A:
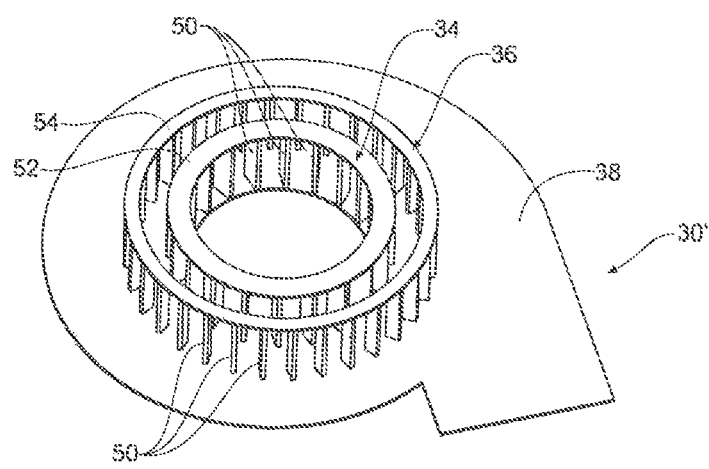
FIG. 7A depicts an exploded perspective view of the stator of embodiment A of a weed seed devitalization arrangement.
Figure 7B:
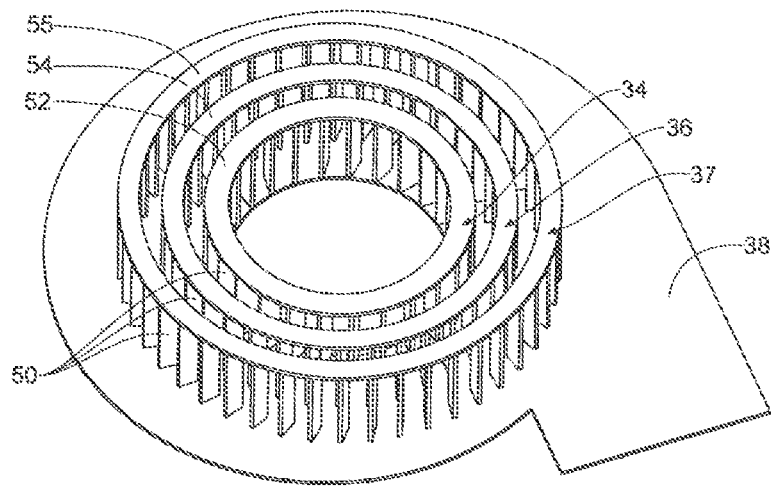
FIG. 7B depicts an exploded perspective view of the stator of another embodiment B of a weed seed devitalization arrangement.
Figure 7C:
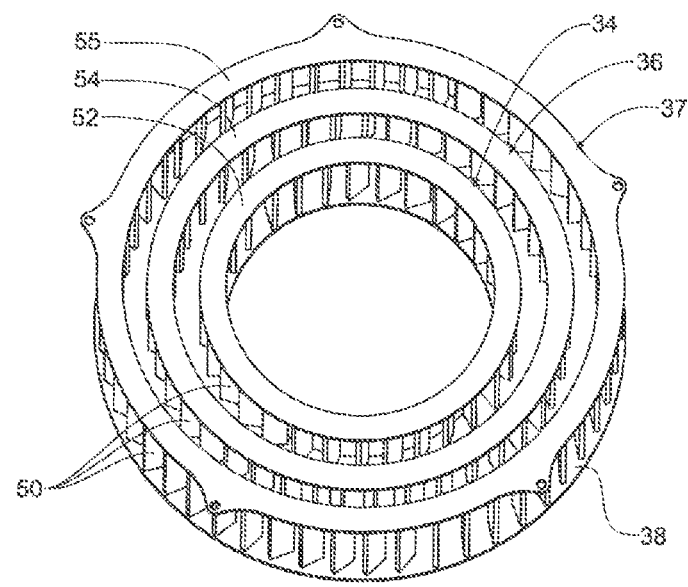
FIG. 7C depicts an exploded perspective view of the stator of another embodiment C of a weed seed devitalization arrangement.

FIG. 7A, 7B and 7C depicts a second half of the three embodiments of the weed seed devitalization arrangement 16. The first embodiment A has two stationary substantially circular arrays 34 and 36 of weed seed impact members that are connected to a plate 38. The plate 38 forms part of the housing 30 when laid over the open cavity formed by the wall 28 of the other half of the housing 30 as depicted in FIG. 6. The second embodiment B has three rotatable substantially circular arrays of weed seed impact members. The third embodiment C has the same member of rotating and stationary impact member arrays as the second embodiment but the impact members of the stationary array have different arrangements to those of the impact members of the embodiments A and B, as more clearly depicted in FIGS. 8C and 9C.

The two halves are connected together to form a rotor/stator arrangement, which with the added support walls 28, 32, and 38 creates a housing 30 for the arrangement. The housing is used to guide material and air to the exit of the weed seed devitalization arrangement. However, it possible for the arrangement with suitable support to perform the function of weed seed devitalization for receiving weed seeds entrained in a portion of the air and material discharged from a combine harvester without the housing, as shown in embodiment C in FIG. 10. The combine harvester can eject a portion of air and material directly into the rotor/stator arrangement. An arrangement included on the combine harvester or on the rotor/stator arrangement may include a distributor arrangement designed to direct air and material including weed seed into the rotor/stator arrangement.

A rotor/stator arrangement includes, in one embodiment, a rotating element 24, stationary substantially circular array of weed seed impact members (20, 22, and 62), rotatable substantially circular array of weed seed impact members (24, 36). In the first embodiment A there are two stationary and two rotatable weed seed impact member arrays. In the second embodiment B three stationary and two weed seed impact member arrays that are rotatable. An extra stationary array of impact members in embodiment B increases the efficiency of embodiment B by using the residual velocity of the material that has been impacted by a rotatable impact member for a further impact. In the third embodiment C includes two stationary and two weed seed impact members arrays that are rotatable as in embodiment B, but the angle of the impact members of the stationary arrays are set differently to those of the impact members of the stationary arrays of embodiments A and B.

The term substantially circular is used in this specification to illustrate that it would be possible to position the individual weed seed impact members other than in a perfectly circular array and still have the stationary and rotatable arrays perform their task of impacting weed seed.

The two halves of the housing 30 are shown in a connected form in FIG. 5, which also depicts a distributor element 40 for receiving and directing a portion of air and entrained material including weed seed discharged from the combine harvester 10. Both embodiments A, B and C fit within this same housing. An example of this distributor element includes a funnel shape made up of four panels 42*a*, 42*b*, 42*c*, and 42*d* that are connected to a cylindrical extension formed on the upper surface of plate 38. The top of one vane 24*a* of the rotating element 24 can be seen in the central portion of the rotor/stator arrangement within the housing. However, the distributor element could take a multitude of forms to fit within different models of combine harvesters and to capture different proportions of air and residue material discharged from the harvester. One embodiment includes the collection of all the material discharged from the combine harvester (that is chaff residue material and straw).

The rotating element 24 is but one way to direct the incoming material and entrained weed seed into the rotor/stator arrangement. One alternative is to rely on the flow or air generated by the one or more rotatable substantially circular arrays of weed seed impact members to draw in the material entrained with weed seed. In another alternative the arrangement includes, a distributor that includes metallic or other suitable material shaped to receive and direct a flow of air, including material and entrained weed seed, and direct it into and through the rotor/stator arrangement, wherein, the distributor essentially changes the direction of the flow of air. In one particular embodiment the distributor is part of a delivery mechanism (not shown) carrying a flow of air including material and entrained weed seed, which when the director distributor is placed into or about at the centre of the substantially circular arrays, directs the flow of air including material and entrained weed seed into and through the various arrays, be they stationary or rotatable, the flow having radial and tangential component with respect to the axis of rotation of the rotatable circular array. The physical shape of the distributor can be varied (by adjusting the shape and configuration or be a replaceable element) for different weed seed and material. Likewise the manner by which the material and weed seed are entrained in an air flow ear be varied depending on the material, the weed seed and how it is stored or generated but this is not a primary aspect of the invention and is well within the skills of the user or as engineer that deals with agricultural equipment.

The housing 30 as depicted in FIG. 5 shows an outlet 44 formed by the walls 28 and the upper plate 38 and lower plate 32 for the air and material exhausted by the weed seed devitalization arrangement. The outlet 44 is arranged to be capable of exhausting all the air and material received by the arrangement.

Details of the rotor/stator arrangement will now be provided. It will be appreciated that the description provided is only of three alternate embodiments of the invention. In these embodiments the weed seed for which the design is optimized (at this time as best known to the inventors) for *Lolium Rigidum* (annual ryegrass) seeds as the wheat chaff residue material stream.

*Lolium Rigidum* seeds weigh around 2.2 milligrams per seed; the seeds are elongated, around 5.8 millimetres in length, 0.8 millimetres in depth and 1.3 millimetres in width. The terminal velocity of *Lolium Rigidum* seeds is around 3.2 meters per second. The terminal velocity of chaff residue material ranges from 1 meter per second for interior wheat cap through to 5 meters pet second for short straw with nodes. The terminal velocity of wheat grain is typically around 8 meters per second. *Lolium Rigidum* and chaff residue material are ejected out the rear of the harvester together because they have a lower terminal velocity than grain, whereas the grain follows a different path and is collected separately by the combine harvester in a grain tank.

The typical wheat chaff residue material flow of a class 8 or 9 combine harvester is up to around 12 tonnes per hour. The proportion of weed seeds in this material flow is very small The airflow from the harvester-cleaning fan is of the order of 5-7 cubic meters of air per second. Each rotor/stator arrangement pump air flows is the order of 1.5 cubic meters per second. The remaining airflow from the harvester cleaning fan is able to exit unrestricted with the straw.

Figure 8A:
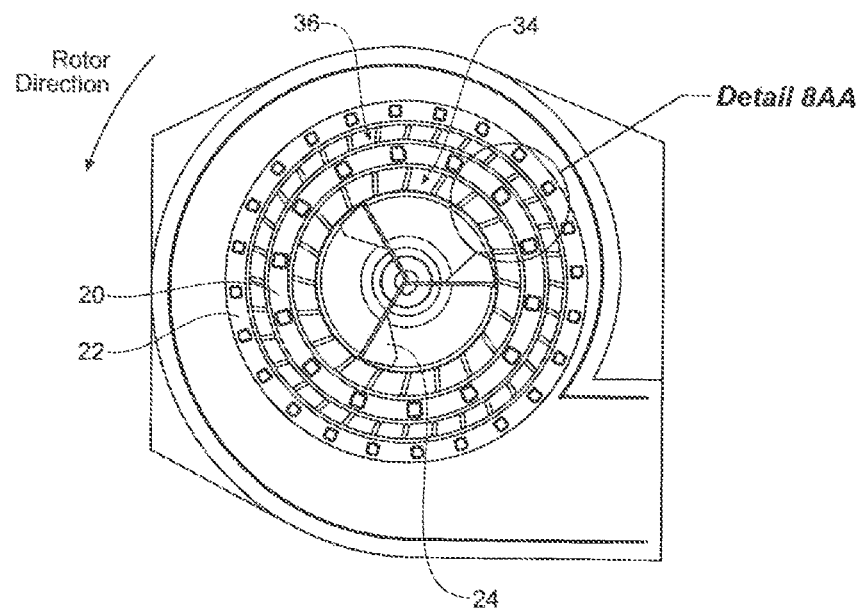
FIG. 8A depict a top cross-sectional view of the stator and rotor of embodiment A of the weed seed devitalization arrangement.
Figure 8A:
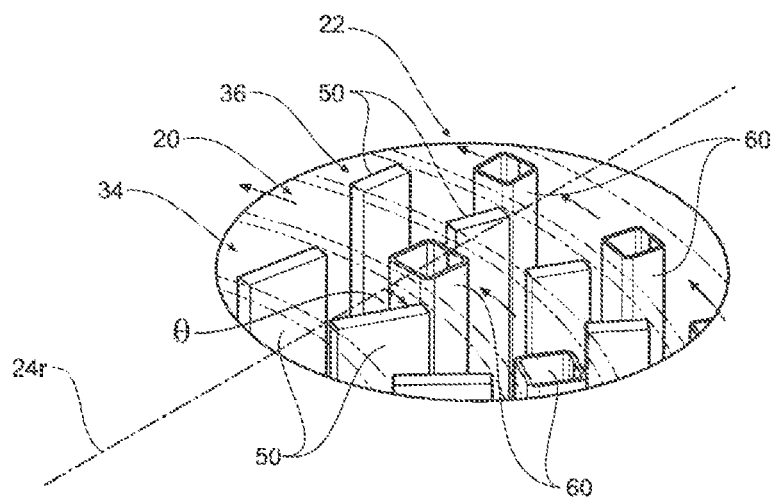
Figure 8B:
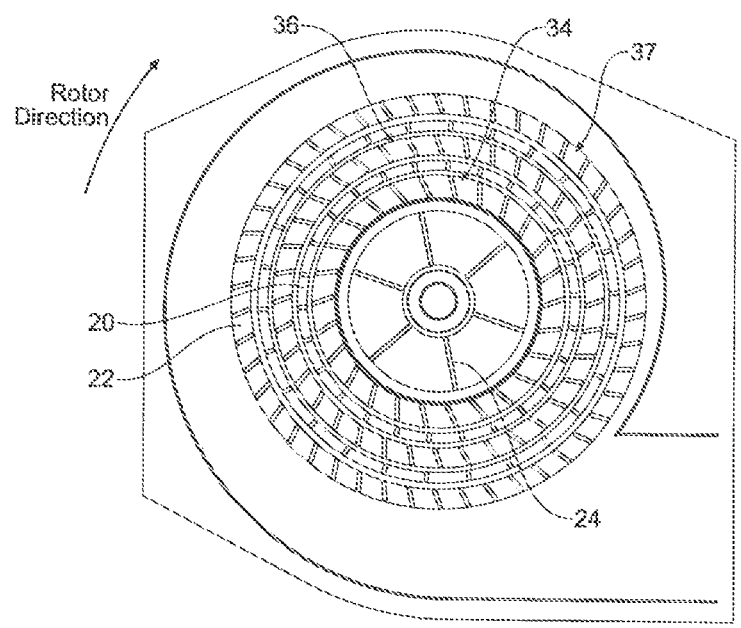
FIG. 8B depicts a top cross-sectional view of the stator and rotor of another embodiment B of the weed seed devitalization arrangement.
Figure 8C:
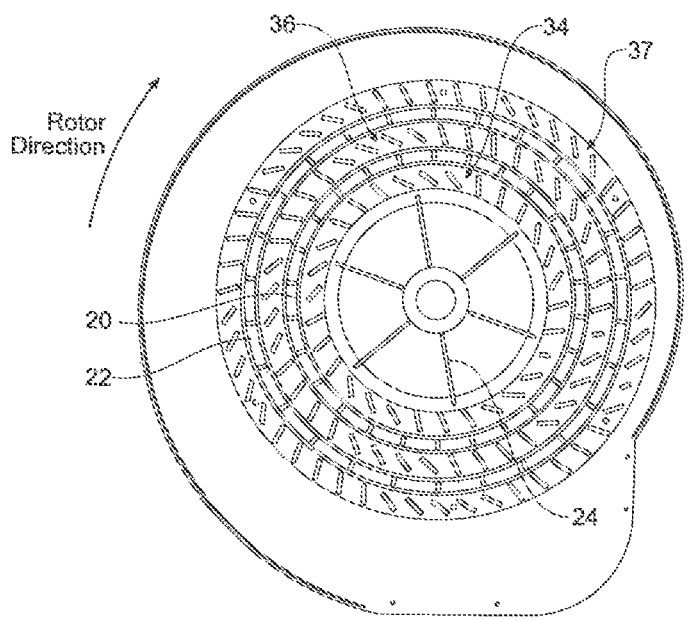
FIG. 8C depicts a top cross-sectional view of the stator and rotor of an embodiment C of the weed seed devitalization arrangement.

FIGS. 8A, 8B and 8C shows a view of the stators and rotors of the three embodiments of the weed seed devitalization arrangement, useful for illustrating the constructed details of the rotor/stator arrangement of a weed seed devitalization arrangement.

Although FIGS. 8A, 8B and 8C provides a top perspective view the side views provided in FIGS. 6A, 6B and 6C and 7A, 7B and 7C show that each of the arrays of weed seed impact members 60 are generally columnar and its this embodiment made of steel tube or bar which are connected, typically by welding, top and bottom members of the columns to respective annular rotor plates.

The two (34, 36) and in FIGS. 7A and three (34, 35,37) in 7B and 7C, stationary (stationary in one view with respect to the housing 30 hat also not rotating as do the rotating strays and thus stationary with respect to the rotating arrays) weed seed impact member arrays include multiple weed seed impact members 50, the nominal top of all the members 50 are welded to the plate 38 and the nominal bottom of the members 50 associated with the radially inner substantially circular array 34 are welded to an annular ring of plate steel 52 and in relation to the radially outer (in this embodiment) substantially circular array 36 welded to a ring of plate steel 54, and in relation to the further embodiment there is a radially outermost substantially circular array 37 welded to a ring of plate steel 55. In an alternate embodiment, the each stationary array of weed seed impact members could be welded to independent support plates (38). In a further alternate embodiment, the stationary weed seed impact members could be designed sufficiently strong to not require support rings 52, 54 or 55.

In all the embodiments A, B and C presented here, the shape of all the weed seed impact members 50 in the stationary array are rectangular in cross-section, although there are a variety of shapes that they could have, wherein a criteria of value to the invention is that at least one face of the member (that face not necessarily being a flat face or surface, because of the location and orientation of the member, which is expected to impact weed seed) is shaped to promote weed seeds to impact nearly at a right angle so the face or surface when they impact the impact member, hence to maximize the normal component of its velocity at impact. Maximizing the normal velocity at impact ensures that the maximum amount of energy is impacted on the seed, thus maximizing the likelihood of devitalization of the weed seed. The impact face or surface of an impact member can be orientated to cause an impacted weed seed to continue its outward path or to be directed inward, possibly to be impacted by another impact member, stationary or rotating, or even to be redirected into the outward flow by the driven rotating element.

To achieve that outcome the face or surface may be curved in a particular way, it may be flat as depicted. Yet further the surface may be contoured or have a texture, by way of example, a textured and hardened surface treatment. The impact members in an array of impact member's need not all have the same surface type or even orientation, as depicted in respect to orientation, in FIG. 9C for each of the arrays of stationary impact members. The arrangement of any particular impact member has, is determined on a number of factors including some but not limited to all or any of the following: speed or rotation; seed type; the driven rotating element shape and speed of rotation; effective height (to be described later in the specification); and others that will be apparent to one of skill in the art knowing the principles of the invention disclosed herein.

The driven rotating element is shaped to draw air and material and entrained weed seed into the rotor/stator arrangement and direct the air and material and entrained weed seed so impact a weed seed impact member of a stationary array within 45° from orthogonal to a facing surface of the weed seed impact member. Describing the angle of impact as being within 45° from orthogonal is a limitation that attempts to ensure that the impact is not just a glancing blow to the weed seed.

The weed seed impact members of a stationary array in an embodiment are solid but alternative forms, such as hollow, two part (replaceable impact face), and preferably made of steel or other materials, for example, plastic, carbon fibre etc. is possible.

The more likely the devitalization of fee seed with one impact the less energy is required by the overall arrangement, hence the careful selection of material, surface, surface shape and surface treatment as well as orientation of the stationary weed seed devitalization impact members.

Figure 9A:
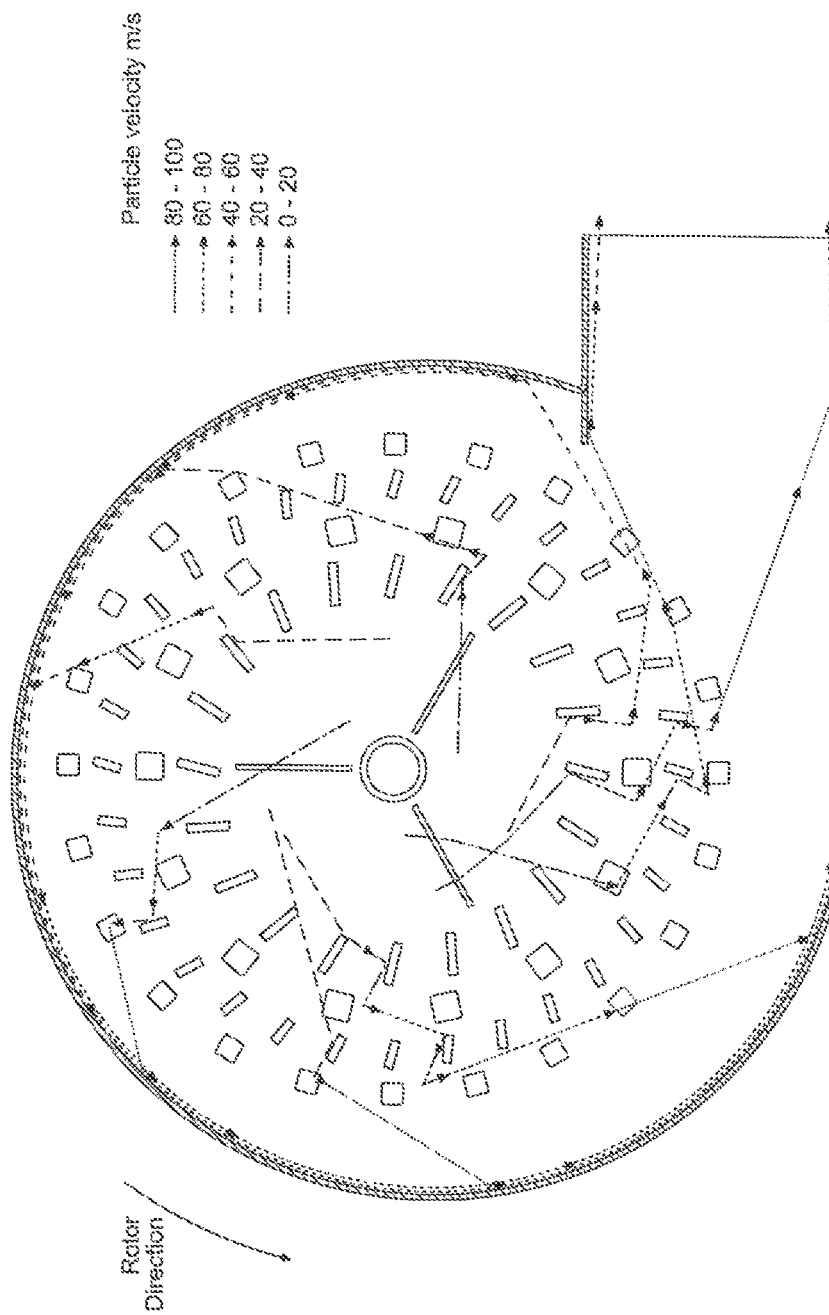
FIG. 9A is a pictorial representation of the path of a weed seed through a plan view of the embodiment A of the rotor/stator arrangement.
Figure 9B:
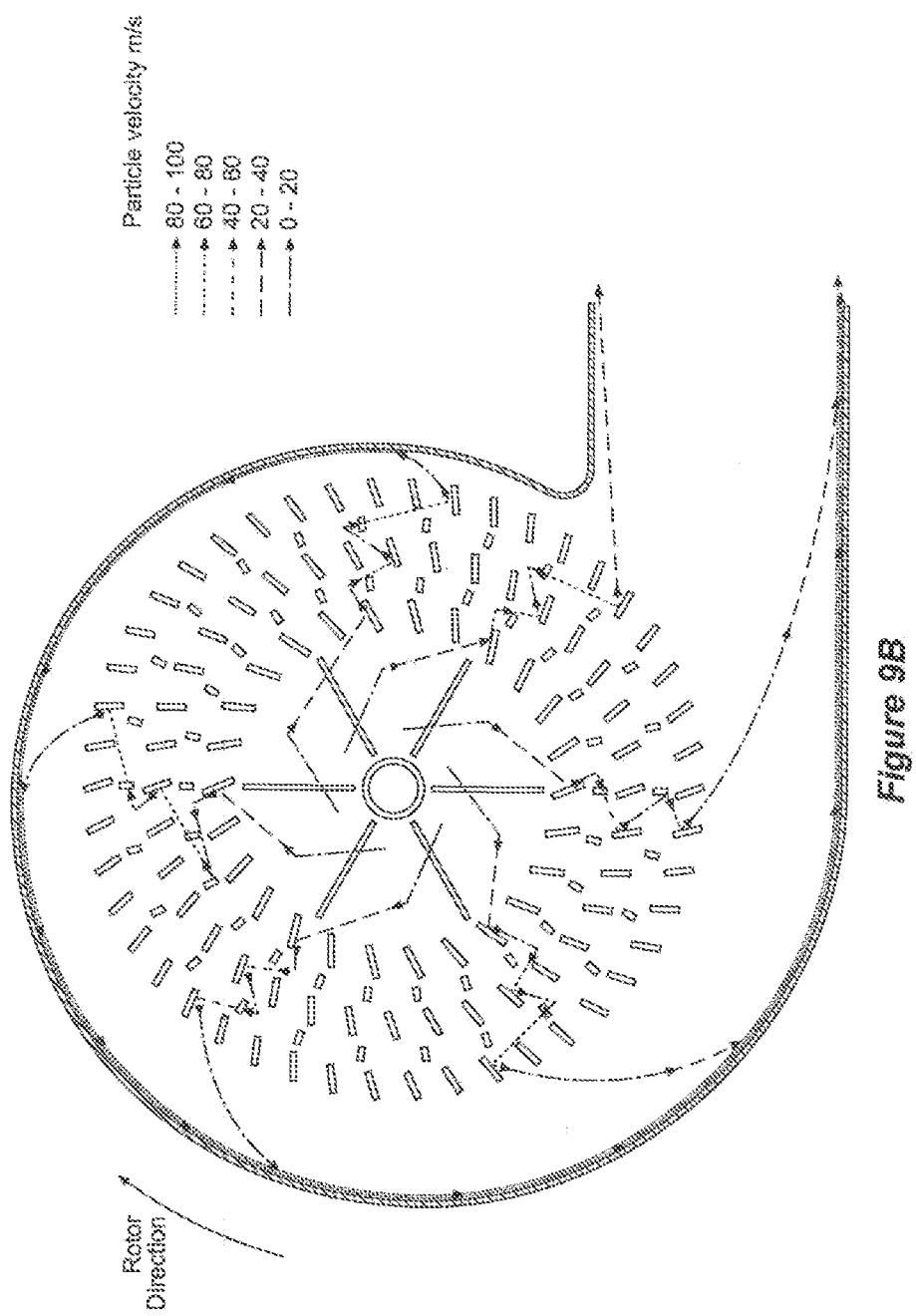
FIG. 9B is a pictorial representation of the path of a weed seed through a plan view of another embodiment B of the rotor/stator arrangement.
Figure 9C:
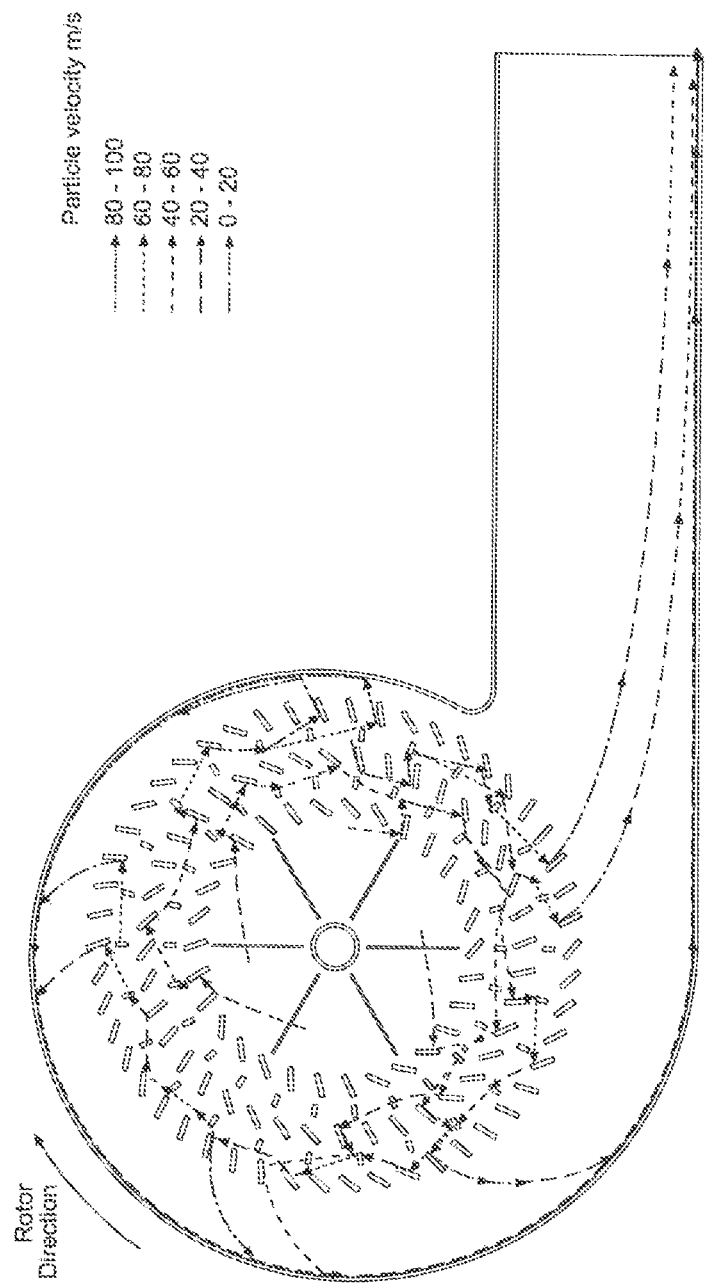
FIG. 9C is a pictorial representation of the path of a weed seed through a plan view of another embodiment C of the rotor/stator arrangement.

FIGS. 9A, 9B and 9C show a Computational Fluid Dynamics (CFD) model calculated particle path through each embodiment. The particle path is calculated from the calculated air flow field generated by the rotor/stator arrangement and the particle acceleration based on the aerodynamic properties of *Lolium Rigidum* seeds. The impact path generated from the computational fluid dynamics model was used as the basis of the design for the three embodiments A, B and C. In embodiments A, B and C presented here, the weed seed impact members of a stationary array have a flat intended impact surface of the rectangular cross-section column embers that are orientated to have an angle $\theta$ with respect to a radius line $24r$ drawn from the axis of rotation $24x$ of the driven rotating element 24 (shown in FIG. 8AA), and about which, in these embodiments, all the rotating impact members rotate. In embodiments A, B and C presented here, angle $\theta$ is inclined to the reverse direction in which the rotor arrays rotate so as to increase the effective normal velocity of the material including weed seed, impacting a surface of the impact member. This arrangement maximizes the likelihood of achieving a direct impact of the weed seed (normal to the surface at the point of impact) rather than a glancing impact. The angle $\theta$ is depleted in detail in FIG. 8AA and FIGS. 9A, 9B and 9C show the respective spacing between stationary and relating arrays of impact members and the tip of the driven rotating element 24 to the circular array of weed seed impact members of a stationary array.

As discussed the angle $\theta$ is chosen to achieve a high normal velocity impact component while maintaining a low radial component of the velocity (radial velocity) of material. The radial velocity after impact must be low enough that the probability of material missing the next array of rotatable impact members is minimal. However, some radial velocity must be maintained so that the material has a low residence time in the arrangement (i.e. the material moves quickly through the arrangement). A high residence time causes high mass fraction of chaff residue material in the impact zone of the array of the rotating and stationary impact bar, which results in energy wasted with particles impacting other particles rather than the particles impacting the rotor/stator. Therefore, a higher residence time results in more material cushioning of impacts and reduced devitalization. Furthermore, a higher residence time results in reduced capacity to process the high mass flow of resides material exiting a combine harvester.

The angle $\theta$ is also chosen to account for some change in the weed seed trajectory due to radial component of motion obtained from aerodynamic forces from the air flow generated by the rotating element 24 and the existing airflow of the harvester output. For lower terminal velocity particles, the radial component of motion is larger and hence the particle path is curved store radially outward and in each case still has a tangential component of motion with respect to the axis of rotation of the drives rotating element which is the same as the axis of notation of the rotatable circular array. For weed seeds with a lower terminal velocity, the angle $\theta$ may need to be increased slightly to achieve the desired direct impact normal to that surface. The particle path shows that approximately one impact occurs to each row of rotating, and stationary impact members in embodiments A and B. Embodiment B has one extra impact due to the extra stationary array of weed seed impact members. The extra static row in embodiment B uses the particle kinetic energy from the last rotating row for particle breakage resulting in increased efficiency compared to embodiment A.

Embodiment C uses two different angles $\theta$ for the weed seed impact members in the stationary substantially circular strays. A larger angle $\theta$ is used to impact material but ensure that it does not pass through the array of stationary impact members at that point and return for another impact with the driven rotating element, or the rotatable impact members. A smaller angle $\theta$ is used to impact material and allow the material to move to the next array of rotatable impact members. The weed seed impact members with different angles $\theta$ are spaced circumferentially such that the material impacts each row of stationary and rotating impact member arrays approximately twice.

Figure 13A:
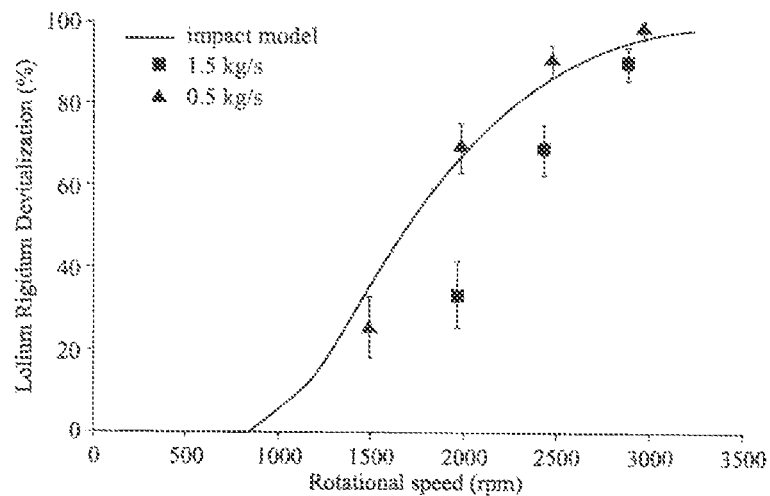
FIG. 13A is a graph of *Lolium Rigidum* seed devitalization vs. rotational speed of the weed seed impact members in a rotating array for embodiment A.
Figure 13B:
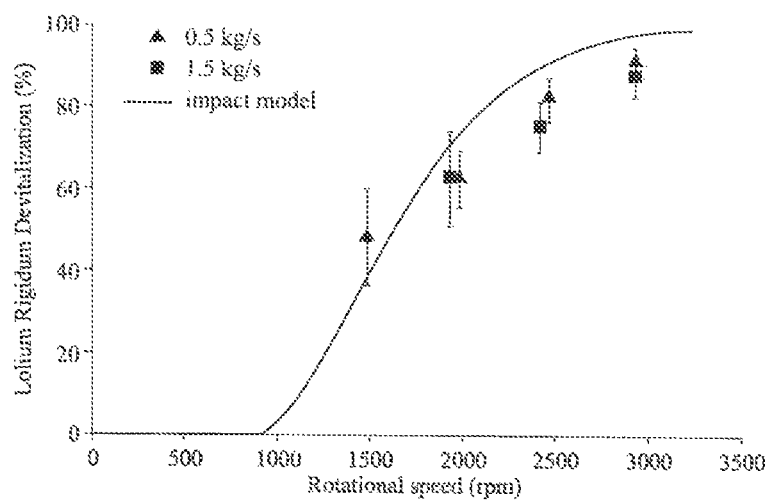
FIG. 13B is a graph of *Lolium Rigidum* seed devitalization vs. rotational speed of the weed seed impact members is a rotating array for embodiment B.

In embodiment B the weed seed impact members of the stationary array have sharp edges and less side wall area which reduces the amount of material that has multiple impacts on each row of impact members. In one embodiment the weed seed impact members of the rotating array are elongated and profiled (tear drop) in cross-section (not shown). Embodiment B has much closer to 1 impact on each row of impact members; minimizing the amount of chaff residue material in each zone; and minimizing the effect of chaff residue material cushioning. This results in embodiment A having a larger drop in devitalization than embodiment B when the chaff mass flow is increased from 0.5 kg/s to 1.5 kg/s, as shown in FIG. 13A and FIG. 13B, respectively.

The increased radial velocity due to radial acceleration from the air flow of the rotating element increases the likelihood of a weed seed missing an array of impact members. The combination of member of impact members in each array, their angle θ, and their length as shown in FIGS. 9A, 9B and 9C determine the probability of an impact occurring and to avoid seeds missing the static array by following air streamlines. The number of impact members in each row is chosen such that gives the approximate average velocity vectors, and the radial acceleration of particles due to aerodynamic forces, there is minimal chance of *Lolium Rigidum* seeds missing the array of static impact members. For weed seeds with a lower terminal velocity, the number of impact members may need to be increased slightly to ensure that the probability of missing the static impact members is low.

There are two weed seed impact member of the rotors (rotatable arrays) 20 and 22 which are depicted in both FIGS. 6A and 6C. In such an embodiment as described both arrays 20 and 22 of weed seed impact members are connected to a single plate 62 most clearly depicted in FIGS. 6A and 6C. Thus, in this embodiment, both arrays rotate at the same rate. However, the arrays may be configured differently to that depicted and thus able to rotate at different rates. FIG. 6B depicts two rotatable arrays 22 and 23.

The individual weed seed impact members 60 of a rotatable array are depicted in top view and perspective side view respectively in FIGS. 6 and 8AA showing that each of the arrays of weed seed impact members are generally columnar and in an embodiment made of steel tube and/or bar which are connected, typically by welding, to top and bottom members.

In the case of the rotatable element the two weed seed arrays 22 and 23 (best shown in FIGS. 6A, 6B and 6C) include multiple weed seed impact members 60, the nominal bottom of all the members 60 are welded to the plate 62 and the nominal top of the members 60 associated with the radially innermost substantially circular array 22 are welded to an annular ring of plate steel 64 and in relation to the radially outermost (in this embodiment) substantially circular array 22 to an annular ring of plate steel 66.

In all the embodiments, the shape of all the weed seed impact members 60 of a rotatable array is square in cross-section, although there are a variety of shapes that they could have, wherein a criteria of value to the invention is that at least one face (there may be one or multiple faces of this member which are impacted by weed seed during operation of the arrangement) of the member (that face, because of the location and orientation of the member, which is expected to impact weed seed) is shaped to ensure that weed steeds impact nearly at right angles to the surface at the point of impact, hence to maximize the normal component of its velocity at impact, thus maximizing the likelihood of devitalization of the weed seed. To achieve that outcome, the surface may be curved in a particular way or it may be flat as depicted. Yet further, the surface may be contoured or have a texture, by way of example, a textured and hardened surface treatment.

The weed seed impact members of a rotatable array in a first embodiment A is hollow steel and arc lighter than a solid bar thus lessening the bending moment due to centrifugal acceleration as well as presenting a tower moment of inertia for lower torque start-up. The weed seed impact members of a rotatable array in the second embodiments B and C ate solid steel, which increases the wear life of the impact members.

The more likely the devitalization of the seed with one impact the less energy is required by the overall arrangement, hence the careful selection of the overall arrangement, that includes but is not limited to surface, surface shape and surface treatment as well as orientation of the weed seed impact members of a rotatable array.

The single plate 62 is also connected to and used to rotate the driven rotatable element 24, thus the weed seed impact member arrays 20 and 22 of a rotatable array, and the driven rotatable element 24 all rotate at the same rate. However, the driven rotatable element may be configured differently to that described in this embodiment so that it can rotate separately from each weed seed impact member array. Note also that the driven rotatable element 24 is at or near the centre of the housing 30.

The effective height H of all the weed seed impact members and associated array forming elements is determined by the overlapping regions of the rotatable and stationary weed seed impact member arrays as illustrated pictorially to FIG. 4. The effective height of the rotor/stator arrangement and the effective impact area (area enclosed by rotor and stator that is not taken up by impact members in FIG. 8) determine the impact zone air volume of the rotor/stator arrangement. The impact zone air volume of the rotor/stator arrangement influences the mass fraction of material in the impact zone for a particular rotor/stator design that has a certain residence time of material and is processing a certain mass flow of material. For example, given the residence time of a particular rotor/stator arrangement design processing a certain mass flow of material, increasing the effective height of a rotor/stator arrangement would increase the impact zone air volume and reduce the mass fraction of material its the impact zone. Consequently, increasing the effective height of the rotor/stator arrangement would reduce the likelihood of inefficient particle-to-particle impacts resulting in a likely increase in efficacy and an increase to the mass flow capacity. The effective height of the impact members is proportional to the volume flow rate of air of the rotor/stator arrangement, increasing the effective height of the arrangement increases the amount of air that is taken through the arrangement. However, any increase in effective height is at the cost of power consumption to drive the arrangement. The effective height is also limited by the mass of rotating impact members and second moment of area of the impact member, that is, the material and whether it is solid or hollow needs to be strong enough to withstand bending moment caused by centrifugal acceleration on the rotating array of impact members.

In the three embodiments shown here, there is extensive use of metal to form the various elements and members, mainly so that the strength and wear characteristics of the arrangement would not be a limiting factor in its operation. However, there is no reason for alternative materials to be used its future embodiments where the driven rotating element, and arrays of both stationary and rotatable weed seed impact members of respective arrays are made of, such as for example, plastic or other hard wearing material. In particular, the use of plastic for the rotating or rotatable elements and members will result in their moment of inertia being less compared to the steel versions used in the described embodiments, which will lessen the torque needed to start the rotor. As would be expected heat is generated by the arrangement during its use, mainly caused by the friction involved in the impact of material entrained in the large volume of air flow through the housing 30.

In the first embodiment A, the driven rotatable element 24 is shaped to redirect air and material received by the distributor element 40 of the housing 30 from the combine harvester. The element 24 (FIG. 6A) in this embodiment includes three equally radially spaced metal plates 24a, 24b, and 24c (vanes) connected together along a common axis of rotation 24x (FIG. 6).

The nominal upper tips of the plates 24a, 24b and 24c are all shaped to capture and redirect air and material in an outward direction with respect to the axis of rotation 24x of the driven rotatable element 24. The height of the driven rotatable element 24 is substantially similar to the height of the stationary and rotatable arrays of weed seed impact members but may extend into the distributor element 40 of the housing 30 (FIG. 5). The driven rotatable elements preferably distribute the material evenly in the axial and circumferential direction. An even distribution ensures that the mass fraction of chaff residue material to air in the impact zone of the first array of impact members is even throughout the volume of the array. Therefore, the likelihood of weed seed to impact throughout the rotor/stator arrangement is maximized as opposed to cushioned impact of weed seeds with chaff residue material. The number of rotatable elements, the rotational speed, and chaff residue material entry speed determines how far the material moves axially downward before being forced radially (outward) with respect to the rotational axis 24x into the first array of impact elements. Given an effective height H, there are an optimum number of rotatable elements. Having more rotatable elements means that material will be forced outward too quickly and the material will be concentrated in the upper portion of the arrangement. Less rotatable elements means that the material will fall too far down (axially) before being forced outward, meaning that there will be a concentration of material in the lower portion of the arrangement. A concentration of material is likely to increase the chaff residue material cushioning of impacts and therefore reduce the devitalization of weed seeds. It would be possible because of an increased depth of the arrangement to use two rotatable elements.

A useful consequence of appropriately sizing the plates 24a, 24b, and 24c, is that when rotating, their nominally vertical peripheral edges are spaced a distance from the radially innermost stationary substantially circular stray of nominally vertical weed seed impact members such that elongated air borne material that bridges the spaced distance is chopped or bent, thus effectively being smaller in length and more easily transported through the arrangement and the subsequent outlet 44 of a housing 30 thus reducing the possibility of blockage by material.

In the second and third embodiments B and C, the driven rotatable element is triangular shaped. Rather than guide material with the driven rotatable elements as with embodiment A, material is able to fall into the central portion under gravity and is distributed using six equally spaced driven rotatable elements. The method of distributing material is different tot embodiments B and C compared to embodiment A. However, both methods provide a more even axial distribution of chaff throughout the effective height H of the rotor/stator arrangement. The driven rotatable element in embodiments B and C has a support ring (20) but could operate without this ring.

Figure 12:
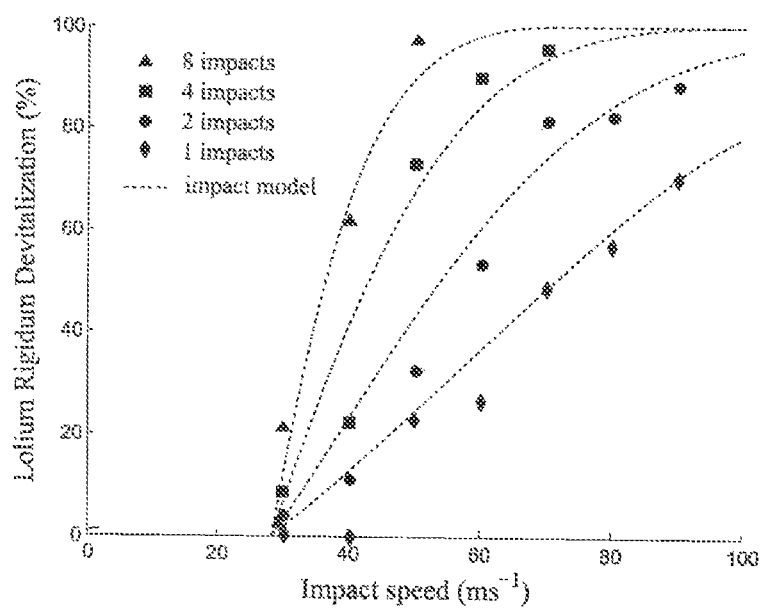
FIG. 12 is a graph of *Lolium Rigidum* seed devitalization percentage vs. impact speed per impact.

FIG. 12 is a graph of *Lolium Rigidum* seed devitalization percentage vs. tip speed (the rotational speed of the tip of a plate 24a) for different number of impacts. The data was obtained by subjecting individual seeds to a specific number of impacts at specific speeds using a rotational impact tester. The processed seeds were germinated and compared to a control germination of unprocessed seeds to calculate weed seed devitalization. On this plot, a master curve equation has been fitted to predict seed devitalization percentage given any combination of number of impacts and impact speed. This equation is a material characteristic specific to *Lolium Rigidum* seeds. The same method could be used to develop an equation for the material characteristic for other target weed seeds.

FIGS. 9A, 9B and 9C are images based on a Computational Fluid Dynamics (CFD) particle study of the rotor/stator arrangement. The number of impacts and impact speeds were predicted from the CFD model by inputting particles with equivalent aerodynamic properties of *Lolium Rigidum* seeds and analyzing the particle trajectories, however, only a select few are illustrated to reduce the complexity of the illustration. Such a CFD model can be readily created by one skilled in the relevant art so as to assist with "what-if" development of alternative arrangements of rotors and stators and impact members and associated support and rotation arrangements. A number of iterations in geometry have been modeled to find a configuration that minimizes particles missing the rotational and stationary impact members.

Figure 10:
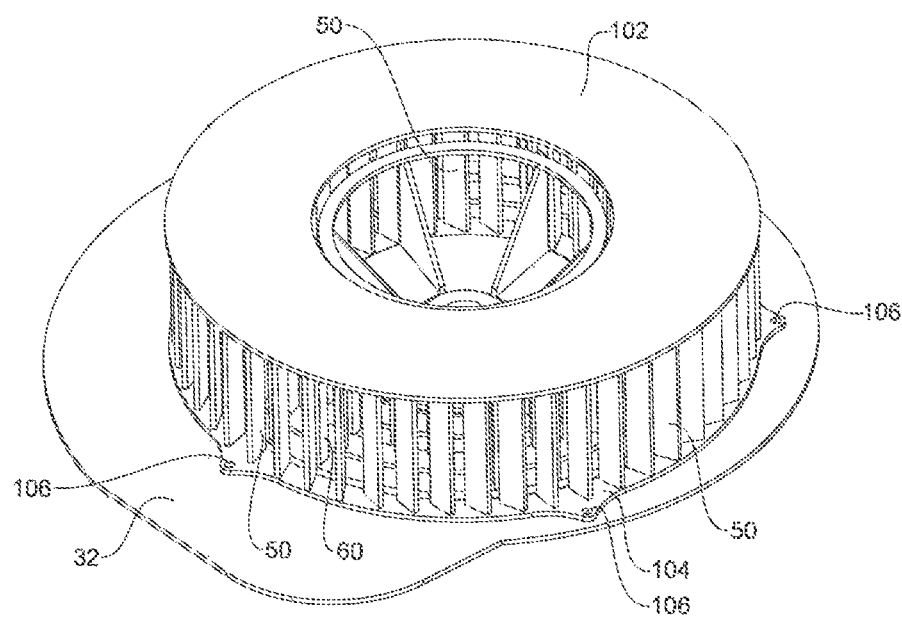
FIG. 10 depicts a perspective view of the rotor/stator arrangement of embodiment C assembled without a housing.

FIG. 10 depicts a perspective view of the stator assembly and rotor assembly fitted together in accord with embodiment C. The stator assembly has two plates 102 and 104 to which are fixed the multiple impact members 50 which are depicted placed over the two rotatable arrays of weed seed impact members 60, and fixed at a number of locations 106 on to plate 32. Like numerals have been used for like elements throughout the specification, although their exact configuration may differ depending on the embodiment and may different in further alternative embodiments not shown but which fall within the scope of the invention as defined herein.

Figure 11:
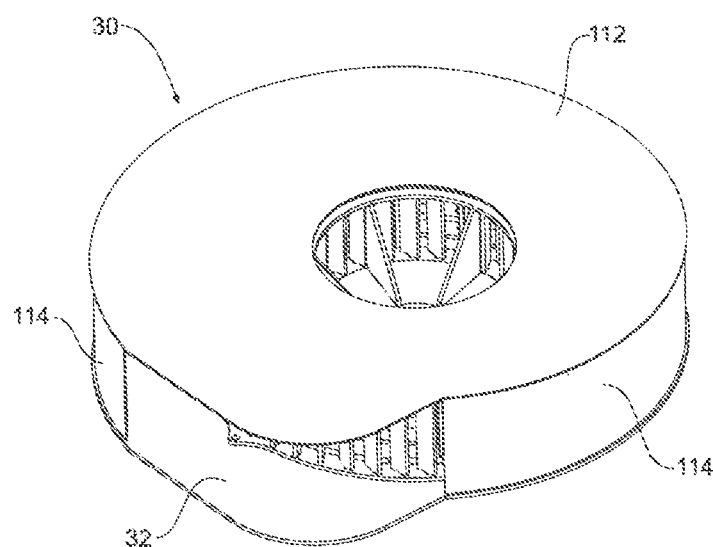
FIG. 11 depicts a perspective view of the combined rotor assembly and stator assembly of embodiment C within a housing.

FIG. 11 depicts a perspective view of the combined rotor assembly and stator assembly of embodiment C within housing. The housing includes a top plate 112 and one or more side walls 114. The side wall provides an outlet aperture for the exit of air, devitalized weed seed and material that has been processed by the devitalization arrangement. The housing in FIG. 11 assists to control the material and air flow direction that exit the rotor/stator arrangement. However, as depicted in FIG. 10 the weed seed devitalization arrangement can perform its primary function of devitalizing weed seeds without the housing.

The opening in the plate 112 is located above the driven rotating element 24 and provides an inlet for air, weed seeds and material, which is a portion of the total discharge from a combine harvester in operation. It is possible to fit a distributor element 40 (FIG. 5) wherein the exit from the distributor element is matched to the opening 116 so as to assist to provide air and material discharged from the combine harvester into the weed seed devitalization arrangement.

The volume of air and material that can be delivered to the weed seed devitalization arrangement does not need to match the total output of the harvester which by way of example can be 5-7 m^3/s since the combine harvester is or can be arranged to separate air and material entrained with weed seed from the harvested grain, say for example to create a volume per second of about 1.5 cubic meters per second per arrangement (3 cubic meters per second for two arrangements) of air and material with entrained weed seed compared to the harvesters' total volume capacity of say about 5-7 cubic meters per second.

The weed seed devitalization arrangement can be arranged along with the combine harvester operation to substantially match the volume of the portion of the air and material provided to the weed seed devitalization arrangement. In one embodiment the effective height, the size of the opening 116, the rotational velocity of the rotatable array of weed seed impact members, and other factors as described herein are usable to determine the capacity of the embodiment of a weed seed devitalization arrangement.

In one example chaff and other residue material including weed seed can be separated from the air flow within the combine harvester without affecting the combiner harvester operation using, for example, the separator baffle 21 depicted in FIGS. 2 and 3 and the threshing and separation unit depicted in FIG. 1.

FIGS. 13A and 13B are graphs of actual and modeled *Lolium Rigidum* devitalization vs. rotational speed of the rotational weed seed impact member arrays for the two embodiments A and B respectively. The model predicted using the predicted number of impacts and impact speeds of the seeds in the rotor/stator arrangement and applying the material equation of the *Lolium Rigidum* seeds found devitalized. The close correlation validates the accuracy of the CFD modeling and method used to predict weed seed devitalization that was used to optimize the rotor/stator arrangement. For embodiment A at 1.5 kg/s per arrangement (10.8 tonnes per hour for 2 arrangements) of chaff residue material the presence of a higher mass fraction of chaff residue material in the impact zone acted to cause more particles to impact each other (inefficient) rather than impacting the rotor/stator (efficient) which reduced *Lolium Rigidum* devitalization. Conversely, for embodiment B, both throughputs of chaff residue material had very similar devitalization, indicating that the mass fraction was not high enough to cause significant particle to particle impacts. The sharper rotor bar edge and reduced side wall area of embodiment B reduced the repeat impacts compared to embodiment A which reduced the residence time of material in embodiment B and thus reduced the mass fraction for a given chaff residue material throughput.

The weed seed devitalization arrangement is fitted (at the time of manufacture or retro-fitted) to the rear 12 (refer to FIG. 1) of the combine harvester, and in operation, draws power from the combine harvester engine.

In a further embodiment the weed seed devitalization arrangement as described herein and in accordance with the scope of a claimed weed seed devitalization arrangement, the arrangement is located remote from a combine harvester discharge area. Thus there is a further element of an arrangement which includes a receiving and directing member for receiving and directing a portion of the air and material discharged from the harvester to be provided to the weed seed devitalization arrangement. In this embodiment the weed seed devitalization arrangement is provided on a platform, which can be mounted elsewhere on the combine harvester or be towed by tie combine harvester. The arrangement may be powered by its own power source or may be powered from the combine harvester.

In yet a further embodiment the weed seed devitalization arrangement as described herein and in accordance with the scope of a claimed weed seed devitalization arrangement, the arrangement is completely separate from a combine harvester. In this embodiment the weed seed devitalization arrangement is configured to receive material previously discharged from the harvester or other device for generating removed plant material from crops and planted areas, such as grass and crops. The material and weed seeds having been previously generated and exhausted from the combine harvester, cropping or cutting machine, such as after having been discharged onto the ground or into a collection arrangement after such a process. In that circumstance there is a further element of an arrangement, including a mechanism used to receive the discharged material and entrain the material into an air flow which is provided to the weed seed devitalization arrangement described and defined herein. In this embodiment a power source separate from the combine harvester or cutting machine is required. This embodiment can be used to process chaff residue material piles left by chaff residue material carts after harvest or can be arranged as an attachment to a stalk slasher device, lawn mower, etc. used to mow council community areas and roadsides and golf courses which is thus capable of processing the typically discarded lawn clippings and weed seeds and to achieving weed seed devitalization as well as particle size reduction, such as for example pelleting.

The invention claimed is:

1. A weed seed devitalization arrangement for receiving air and material entrained with weed seeds, the arrangement including:
   one or more stationary substantially circular array of weed seed impact members, the weed seed impact members of the stationary array having an intended impact surface arranged so as to impact weed seeds passing into the stationary substantially circular array and each impact member being orientated to allow air, material and weed seed to pass radially between adjacent impact members; and
   one or more rotatable substantially circular array of weed seed impact members and each impact member being orientated to allow air, material and weed seed to pass between adjacent impact members, the rotatable array movable about a common axis with respect to a stationary substantially circular array of weed seed impact members,
   wherein the intended impact surface, of an impact member of the stationary array, is orientated to the reverse direction in which the rotor array rotates, so as to either impact and direct a weed seed to pass through radially the stationary array or to impact and direct a weed seed radially inward of the stationary array regardless of the width and length of the weed seed and wherein air, material and impacted weed seed passes radially through each array of impact members.

2. The weed seed devitalization arrangement according to claim 1 further including:
   a distributor element at or near the axis of rotation of the rotatable circular array for receiving air and material entrained with weed seeds and for directing a flow of air and entrained material including weed seeds through the substantially circular arrays, the flow having radial and tangential components with respect to the axis of rotation of the rotatable circular array.

3. The weed seed devitalization arrangement according to claim 1 further including:
   a driven rotating element rotatable about a common axis with respect to the rotatable array for receiving air and material entrained with weed seed for creating a flow of air and entrained material including weed seeds, the flow having radial and tangential components with respect to the axis of rotation of the driven rotating element.

4. The weed seed devitalization arrangement according to claim 1 or 3 wherein there are:
   at least two stationary substantially circular arrays of weed seed impact members; or
   at least two rotatable substantially circular arrays of weed seed impact members.

5. The weed seed devitalization arrangement according to claim 1 wherein each stationary weed seed impact member has a flat intended impact surface.

6. The weed seed devitalization arrangement according to claim 1 or 3 wherein there is a spacing between weed seed impact members in each stationary substantially circular array which is determined by one or more of the following characteristics:
   a. the flow rate of air and material through the stationary and rotatable substantially circular arrays of the arrangement;
   b. the expected range of the length, width and weight of entrained weed seeds;
   c. the expected range of velocities of the entrained weed seeds;
   d. the shape and orientation of each impact member with respect to the direction of air flow in the vicinity of the member;
   e. the likelihood of a weed seed being impacted by the impact member;
   f. the rate of rotation of one or more of the rotatable arrays.

7. The weed seed devitalization arrangement according to claim 1 wherein there is a spacing of weed seed impact members in each rotatable substantially circular array which is determined by one or more of the following characteristics:
   a. the rate of rotation of the respective array;
   b. the flow rate of air and entrained material through the stationary and rotatable substantially circular arrays of the arrangement;
   c. the expected range of the size and weight entrained weed seeds;
   d. the expected range of velocities of the entrained weed seed;
   e. the shape and orientation of each impact member with respect to the direction of air flow in the vicinity of the member;
   f. the likelihood of a weed seed being impacted by the impact member.

8. The weed seed devitalization arrangement according to claim 1 wherein there is an orientation of the intended impact surface of a weed seed impact members in each stationary substantially circular array which is additionally determined by one or more of the following characteristics:
   a. the flow rate of air and entrained material through the stationary and rotatable substantially circular arrays of the arrangement;
   b. the expected range of the size and weight entrained weed seeds;
   c. the expected range of velocities of the entrained weed seed;
   d. the shape and orientation of each impact member with respect to the direction of air flow in the vicinity of the member;
   e. the likelihood of a weed seed being impacted by the impact member;
   f. the rate of rotation of one or more of the rotatable arrays.

9. The weed seed devitalization arrangement according to claim 1 wherein there is an orientation of weed seed impact members in each rotatable substantially circular array which is determined by one or more of the following characteristics:
   a. the rate of rotation of the respective array;
   b. the flow rate of air and entrained material through the stationary and rotatable substantially circular arrays of the arrangement;
   c. the expected range of the size and weight entrained weed seeds;
   d. the expected range of velocities of the entrained weed seed;
   e. the shape and orientation of each impact member with respect to the direction of air flow in the vicinity of the member;
   f. the likelihood of a weed seed being impacted by the impact member.

10. The weed seed devitalization arrangement according to claim 3 wherein the driven rotating element is shaped to draw air and material and entrained weed seed into the arrangement of stationary and rotatable substantially circular arrays and direct the air and material and entrained weed seed to impact the intended impact surface of a stationary weed seed impact member within 45° from orthogonal to the intended impact surface.

11. The weed seed devitalization arrangement according to claim 1 wherein an intended impact surface of at least some weed seed impact members of a stationary array is one or more of the group: flat, curved, textured or combinations thereof.

12. The weed seed devitalization arrangement according to claim 1 wherein a weed seed impact member of a substantially circular arrays is elongated and one of the group: rectangular, square, profiled in cross-section.

13. The weed seed devitalization arrangement according to claim 3 wherein there is space between an outer periphery of the driven rotating element and the adjacent substantially stationary circular array of weed seed impact members, such that material longer than the space is sheared and/or bent to become shorter when it extends across the space while the driven rotating element is rotating.

14. The weed seed devitalization arrangement according to claim 3 wherein the driven rotating element and the rotatable substantially circular array of weed seed impact members are arranged so as to rotate at the same rate about a common axis with respect to the rotatable array.

15. The combine harvester including a weed seed devitalization arrangement as claimed in claim 1 located on the combine harvester so as to receive a portion of the air and material discharged from the air and material discharge area of a combine harvester.

16. The combine harvester including a weed seed devitalization arrangement as claimed in claim 1 located remote from the discharge area of the combine harvester further including;
   a member for receiving and providing a portion of the air and material discharged from the combine harvester to the remote weed seed devitalization arrangement.

17. A method of designing a weed seed devitalization arrangement which receives air and material entrained with weed seeds, the method of designing the arrangement including the steps:
   a) determining the orientation and spacing of one or more stationary substantially circular array of weed seed impact members, the weed seed impact members of the stationary array having an intended impact surface arranged so as to impact weed seeds passing into the stationary substantially circular array and each impact member being orientated to allow air, material and weed seed to pass radially between adjacent impact members; and b) determining the orientation and spacing of one or more rotatable substantially circular array of weed seed impact members, the rotatable array movable at a range of speed of rotation about a common axis with respect to a stationary substantially circular array of weed seed impact members array and each impact member being orientated to allow air, material and weed seed to pass radially between adjacent impact members, and c) determining the orientation of an intended impact surface, of an impact member of the stationary array, being orientated to the reverse direction in which the rotor array rotates, so as to either impact and direct a weed seed to pass through the stationary array or to impact and direct a weed seed radially inward of the stationary array regardless of the width and length of the weed seed.

\* \* \* \* \*